(12) United States Patent
Liao

(10) Patent No.: US 10,449,756 B2
(45) Date of Patent: Oct. 22, 2019

(54) THREE DIMENSIONAL PRINTING APPARATUS

(71) Applicants: XYZprinting, Inc., New Taipei (TW); Kinpo Electronics, Inc., New Taipei (TW)

(72) Inventor: Chia-Wu Liao, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 51 days.

(21) Appl. No.: 15/075,206

(22) Filed: Mar. 21, 2016

(65) Prior Publication Data

US 2017/0217096 A1  Aug. 3, 2017

(30) Foreign Application Priority Data

Jan. 29, 2016  (CN) .......................... 2016 1 0065374

(51) Int. Cl.
*B29C 64/165*  (2017.01)
*B33Y 30/00*  (2015.01)
*B33Y 10/00*  (2015.01)

(52) U.S. Cl.
CPC ............ *B33Y 30/00* (2014.12); *B29C 64/165* (2017.08); *B33Y 10/00* (2014.12)

(58) Field of Classification Search
None
See application file for complete search history.

(56) References Cited

U.S. PATENT DOCUMENTS 9,242,413 B2   1/2016 Hartmann et al.
2005/0225007 A1* 10/2005 Lai ...................... B29C 67/0081
                                                   264/308

(Continued)

FOREIGN PATENT DOCUMENTS

JP    2006137173    6/2006
JP    2013056466    3/2013

(Continued)

OTHER PUBLICATIONS

"Search Report of Europe Counterpart Application," dated Jul. 31, 2017, p. 1-p. 10, in which the listed references were cited.

(Continued)

*Primary Examiner* — Jacob T Minskey
*Assistant Examiner* — Baileigh Kate Darnell
(74) *Attorney, Agent, or Firm* — JCIPRNET

(57) ABSTRACT

A three dimensional printing apparatus is provided, and the three dimensional printing apparatus includes a modeling portion, a powder supplying portion, a powder spreading mechanism, a printing mechanism and a controller. The powder supplying portion is filled with a powder forming material. The powder spreading mechanism is disposed on a first side of the modeling portion, and is configured to transfer the powder forming material from the powder supplying portion to spread the powder forming material on the supporting platform. The printing mechanism is disposed on a second side of the modeling portion which is opposite to the first side, and is configured to eject the glue material. The controller operates in a fast mode according to a fast mode instruction, so as to control the printing mechanism to eject the glue material onto the powder forming material while moving along a first direction with the powder spreading mechanism.

9 Claims, 9 Drawing Sheets

(56) References Cited

U.S. PATENT DOCUMENTS

| | | |
|---|---|---|
| 2006/0099287 A1 | 5/2006 | Kim et al. |
| 2014/0306379 A1 | 10/2014 | Hartmann et al. |
| 2015/0231832 A1 | 8/2015 | Shi et al. |
| 2015/0266239 A1 | 9/2015 | Okamoto et al. |
| 2015/0273728 A1* | 10/2015 | Okamoto ............ B29C 67/0081 428/413 |

FOREIGN PATENT DOCUMENTS

| | | |
|---|---|---|
| JP | 2014113695 | 6/2014 |
| WO | 2009145069 | 12/2009 |

OTHER PUBLICATIONS

"Office Action of Japan Counterpart Application," dated May 14, 2019, p. 1-p. 4.

* cited by examiner

THREE DIMENSIONAL PRINTING APPARATUS

CROSS-REFERENCE TO RELATED APPLICATION

This application claims the priority benefit of China patent application serial no. 201610065374.0, filed on Jan. 29, 2016. The entirety of the above-mentioned patent application is hereby incorporated by reference herein and made a part of the specification.

BACKGROUND

Technical Field

The disclosure relates to a printing apparatus, and particularly relates to a three-dimensional printing apparatus.

Description of Related Art

With advancement in computer-aided manufacturing (CAM), a three dimensional printing technology has been developed in the manufacturing industry. With the technology, products can be rapidly manufactured from an original design concept. The three-dimensional printing, in fact, is a general term of a series of rapid prototyping (RP) techniques, and the concept thereof is laminate manufacturing. Specifically, a rapid prototyping machine is used to form cross-sectional shapes of a workpiece in the X-Y plane through scanning, shift intermittently at a layer thickness in the Z coordinates, and ultimately form three-dimensional objects. The three-dimensional printing technology is unrestrictedly applicable for geometric shapes, and the RP technology produces excellent outputs particularly for complex parts, which saves efforts and processing time significantly. Therefore, the digital three-dimensional printing technology is capable of presenting an object of a digital three-dimensional model designed by means of computer-aided design (CAD) software under the requirement of limited time for the user to touch and actually feel the geometry of the model. Furthermore, the assembling properties of parts, or even functional tests, can be conducted.

Currently, several ways to form thin cross-sectional layers have been developed. Taking the technique of forming a three-dimensional structure by using a powder-like modeling material, for example, such technique is implemented by spreading a powder layer (e.g., a powder-like ceramic material, a powder-like metal material, or a powder-like plastic material) with a thickness about 100 micrometers on a supporting surface, and using a specifically designed printing mechanism to eject a glue material to the powder, so as to adhere the powder in a specific region to form a layer. The process is repetitively performed to sequentially form powder layers. The powder layers are stacked with respect to each other to form a three-dimensional object.

To evenly spread the powder on the supporting surface, a powder supplying mechanism moves from an initial preparation position at one end of a printing machine to another end of the printing machine, so as to evenly spread the powder on the supporting surface. In a conventional design integrating the printing mechanism and the powder spreading mechanism, the powder spreading mechanism needs to wait until the printing mechanism completes printing to move back to the initial preparation position. Alternatively, in another conventional design where a moving path of the printing mechanism and a moving path of the powder spreading mechanism are perpendicular to each other, the printing mechanism needs to wait until the powder supplying machine moves back to the initial preparation position to start moving and spreading the glue material to the powder. Thus, a three-dimensional printing efficiency of such technique is still low, and thus fails to meet the requirements of a rapid and high yield rate.

SUMMARY

The disclosure provides a three-dimensional printing apparatus capable of independently controlling a powder spreading mechanism and a printing mechanism to move along the same axial direction, so as to increase a three-dimensional printing efficiency.

An embodiment of the disclosure provides a three-dimensional printing apparatus adapted to print a three-dimensional object. The three-dimensional printing apparatus includes a modeling portion, a powder supplying portion, a powder spreading mechanism, and a printing mechanism. The modeling portion includes a supporting platform, and the powder supplying portion is filled with a powder forming material. The powder spreading mechanism is disposed at a first side of the modeling portion, moves along a first axial direction parallel to a supporting surface of the supporting platform, and spreads the powder forming material on the supporting platform. The printing mechanism is disposed at a second side of the modeling portion opposite to the powder spreading mechanism, moves along the first axial direction, and adapted to eject a glue material toward the powder forming material on the supporting platform, such that the three-dimensional object is formed layer-by-layer on the supporting platform. The controller is coupled to the powder spreading mechanism and the printing mechanism and operates in a fast mode based on a fast mode command to control the printing mechanism to eject the glue material onto the powder forming material while the printing mechanism and the powder spreading mechanism move along a first direction.

Based on above, in the embodiments of the disclosure, the three-dimensional printing apparatus includes the powder spreading mechanism and the printing mechanism respectively disposed at opposite sides of the modeling portion, and the controller uses different transportation mechanisms to respectively control the powder spreading mechanism and the printing mechanism to move along the same axial direction. The controller may operate in the fast mode and the normal mode based on the command, and the printing mechanism may perform printing in respectively different printing directions in the fast mode and the normal mode. In this way, the three-dimensional printing apparatus may save waiting time of the powder spreading mechanism and the printing mechanism in the fast mode and increase the printing efficiency. Alternatively, the three-dimensional printing apparatus may also make the printing direction and the powder spreading direction in the normal mode consistent to ensure the printing quality.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
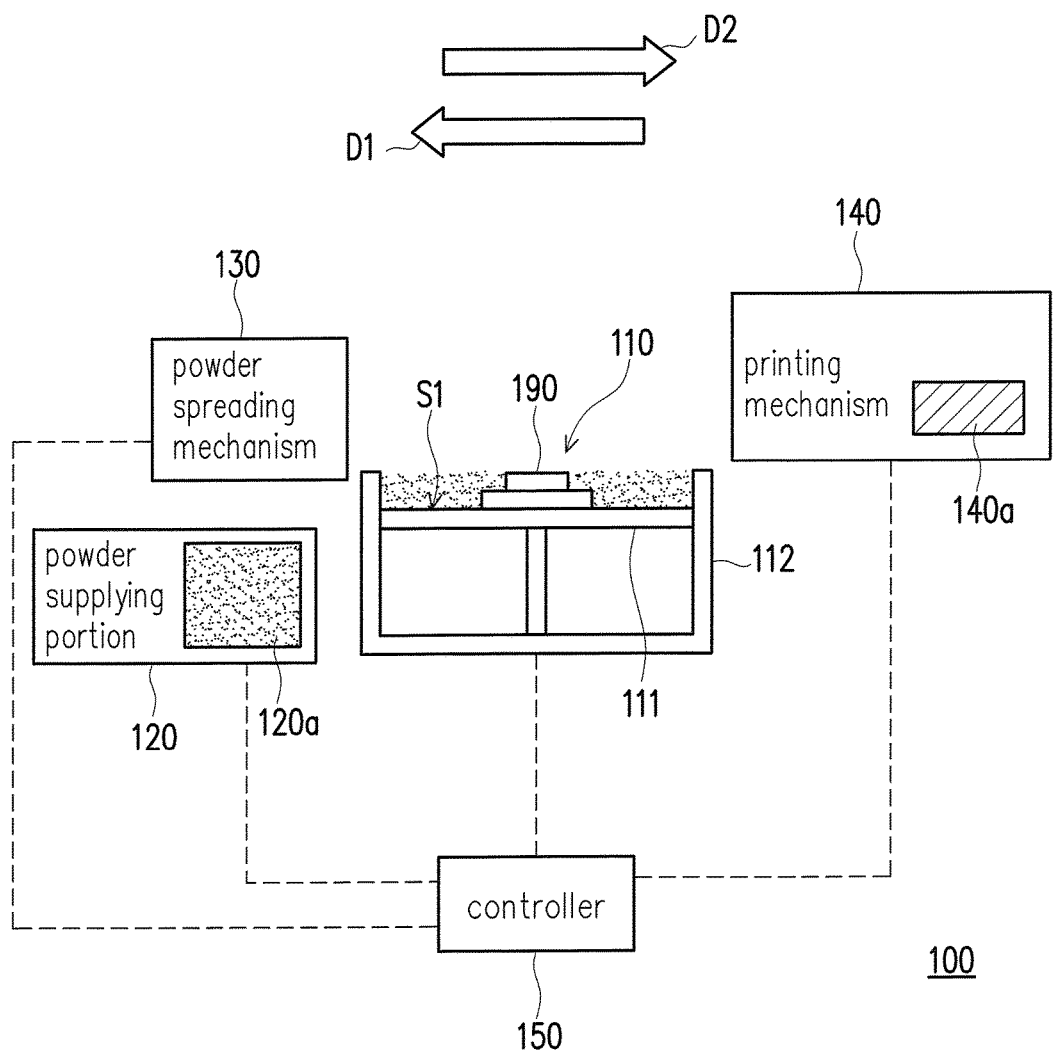
FIG. 1 is a schematic view illustrating a three-dimensional printing apparatus according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

It is to be understood that both the foregoing and other detailed descriptions, features, and advantages are intended to be described more comprehensively by providing embodiments accompanied with figures hereinafter. In the following embodiments, wordings used to indicate directions, such as "up," "down," "front," "back," "left," and "right", merely refer to directions in the accompanying drawings. Therefore, the directional wording is used to illustrate rather than limit the disclosure. In addition, in the following embodiments, like or similar components will be referred to like or similar reference symbols.

FIG. 1 is a schematic view illustrating a three-dimensional printing apparatus according to an embodiment of the disclosure. In this embodiment, a three-dimensional printing apparatus 100 is adapted to print a three-dimensional object based on a digital three-dimensional model. In this embodiment, the three-dimensional printing apparatus 100 is adapted to print a three-dimensional object based on digital model information. Specifically, the digital three-dimensional model may be a digital three-dimensional image file constructed by a computer host through a computer-aided design (CAD) or animation modeling software, for example. The three-dimensional printing apparatus 100 may be adapted to read and process the digital three-dimensional model and print the three-dimensional object based on the digital three-dimensional model.

Referring to FIG. 1, the three-dimensional printing apparatus includes a modeling portion 110, a powder supplying portion 120, a powder spreading mechanism 130, a printing mechanism 140, and a controller 150. The modeling portion 110 includes a supporting platform 111 and a modeling sink 112, and the powder supplying portion 120 is filled with a powder forming material 120a. More specifically, the supporting platform 111 may move up or down in the modeling sink 112. The powder supplying portion 120 may fill the powder forming material into the modeling sink 112 by itself or through the powder spreading mechanism 130. For example, the powder supplying portion 120 may be disposed above the modeling portion, and spread the powder forming material 120a into the modeling sink 112 through spraying. Alternatively, the powder supplying portion 120 may include a powder supplying sink and a powder supplying platform, so as to spread the powder forming material 120a spilled from the powder supplying sink into the modeling sink 112 by lifting the powder supplying platform and moving the powder spreading mechanism 130.

The powder spreading mechanism 130 is disposed at a first side of the modeling portion 110 and moves along a first axial direction parallel to a supporting surface Si of the supporting platform 111. In addition, the powder spreading mechanism 130 is adapted to spread the powder forming material 120a above the supporting platform 111. More specifically, the powder spreading mechanism 130 may remove redundant powder forming material 120a above the supporting platform 111, such that an upper surface of the powder forming material 120a in the modeling sink 112 is flat and parallel to the supporting surface S 1. The printing mechanism 140 is disposed at a second side of the modeling portion 110 opposite to the powder spreading mechanism 130, and moves along the first axial direction. In other words, the powder spreading mechanism 130 and the printing mechanism 140 move back and forth in the same first axial direction. Namely, a powder spreading direction of the powder spreading mechanism 130 and a printing direction of the printing mechanism 140 may be the same or opposite directions. The printing mechanism 140 is adapted to eject a glue material 140a toward the powder forming material 120a on the supporting platform, such that a three-dimensional object 190 may be formed layer-by-layer on the supporting platform 111 as the supporting platform 111 moves down.

Based on the above, it shall be understood that the three-dimensional printing apparatus 100 is adapted to print a three-dimensional object based on three-dimensional printing information transmitted by a computer host. More specifically, the controller 150 controls operations of respective components of the three-dimensional printing apparatus 100 based on the three-dimensional printing information, so as to adhere layer-by-layer the powder forming material 120 transferred onto the modeling portion 110 to form powder adhering layers stacked with respect to each other.

The controller 150 is coupled to the powder spreading mechanism 130 and the printing mechanism 140, and may be a central processing unit (CPU), or other programmable general-purpose or specific-purpose microprocessors, digital signal processors (DSP), programmable controllers, application specific integrated circuits (ASICs), programmable logic devices (PLDs), other similar devices, or a combination of the devices, for example.

It should be noted that, in this embodiment, the controller 150 may determine whether to operate in a fast mode or in a normal mode based on a command, and accordingly control movements and timing of the movements of the powder spreading mechanism 130 and the printing mechanism 140. More specifically, the controller 150 operates in the fast mode based on a fast mode command. The command may be sent by a user via a user operational interface of the three-dimensional printing apparatus 100 or determined by the controller 150 based on the three-dimensional printing information. The disclosure does not intend to impose a limitation in this regard.

It should be noted that, in both the fast mode and the normal mode, the powder spreading mechanism 130 moves along a second direction D2 toward the second side of the modeling portion to flatly spread the powder forming material 120a above the supporting platform 111, and then moves back to the first side of the modeling portion 110 along the first direction D1. In other words, the second direction D2 may be referred to as a powder spreading direction of the powder spreading mechanism 130. The powder spreading mechanism 130 moves in the powder spreading direction and spreads the powder forming material 120a flatly above the modeling portion 110 while located above the modeling sink 112.

In this embodiment, while the three-dimensional printing apparatus 100 operates in the fast mode, the printing mechanism 140 ejects the glue material 140a to the powder forming material 120a while moving with the powder spreading mechanism 130 along the first direction D1, so as to adhere the powder forming material 120a on the supporting platform 112 to form a modeling powder layer. Under this circumstance, the printing direction of the printing mechanism 140 in the fast mode is the first direction D1. Alternatively, while the three-dimensional printing apparatus 100 operates in the normal mode, the printing mechanism 140 moves along the second direction D2 and ejects the glue material 140a to the powder forming material 120a after the powder spreading mechanism 130 moves along the first direction D1 to the first side of the modeling portion 110. In other words, in the normal mode, the printing mechanism 140 needs to move to the first side of the modeling portion 110 after the powder spreading mechanism 130 completes powder spreading. Under this circumstance, the printing direction of the printing mechanism 140 in the normal mode is the second direction D2.

Figure 2:
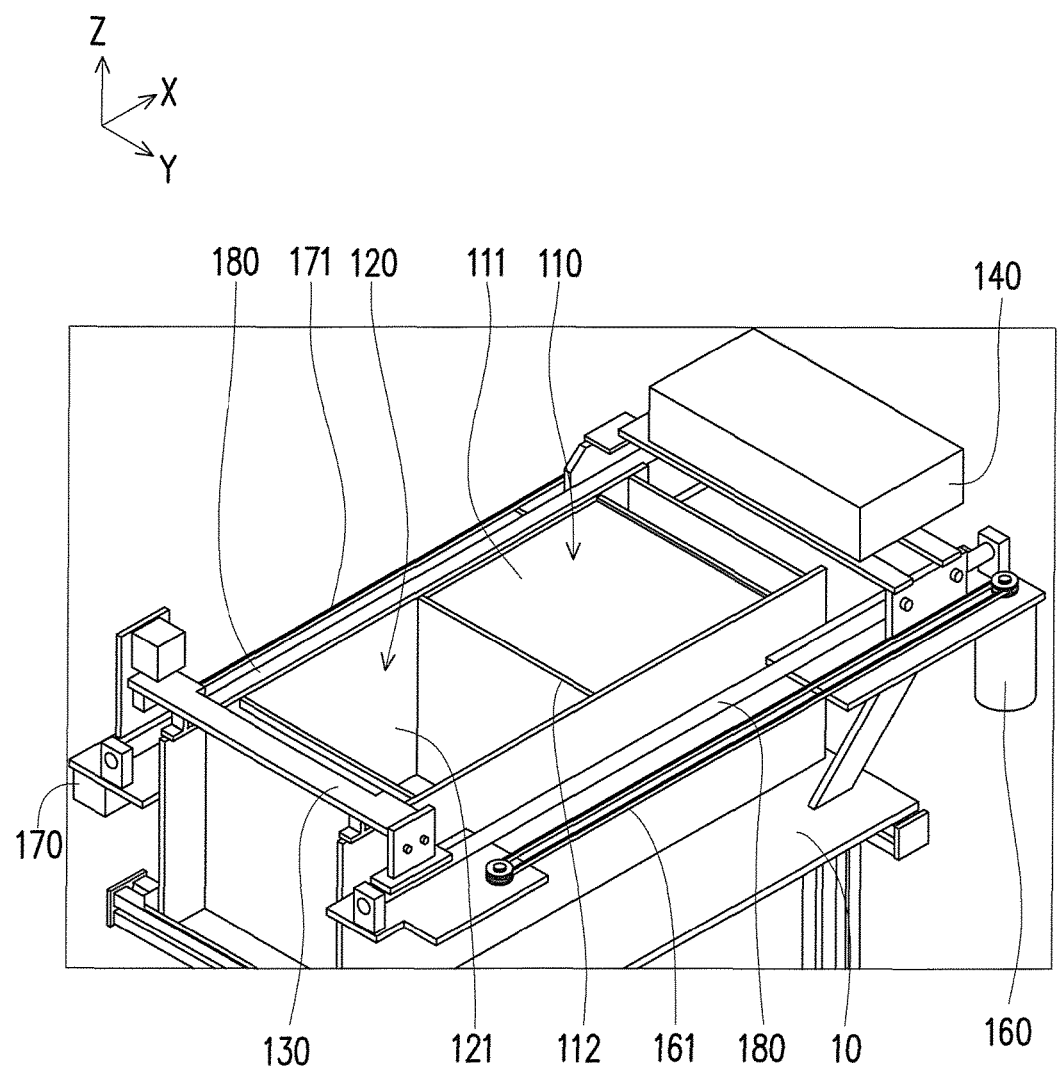
FIG. 2 is a schematic perspective view illustrating a three-dimensional printing apparatus according to an embodiment of the disclosure.
Figure 3:
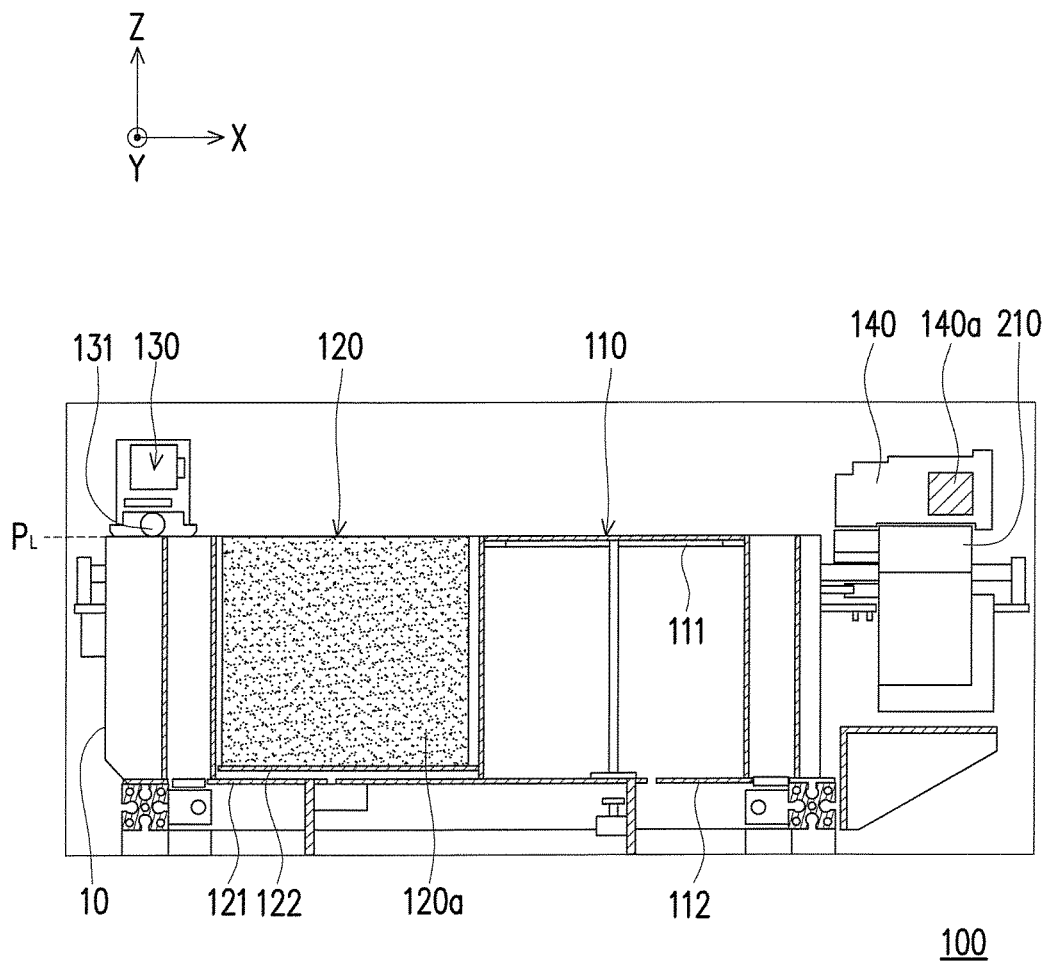
FIG. 3 is a schematic cross-sectional view illustrating the three-dimensional printing apparatus of FIG. 2.

In the following, details are described using the powder supplying portion 120 including the powder supplying sink and the powder supplying platform as an example. FIG. 2 is a schematic perspective view illustrating a three-dimensional printing apparatus according to an embodiment of the disclosure. FIG. 3 is a schematic cross-sectional view illustrating the three-dimensional printing apparatus of FIG. 2. Referring to FIGS. 2 and 3 together, the three-dimensional printing apparatus 100 includes a base 10. The modeling portion 110, the powder supplying portion 120, the powder spreading mechanism 130, and the printing mechanism 140 are provided on the base 10. The modeling portion 110 and the powder supplying portion 120 are disposed in an arrangement along the first axial direction (X-axis direction).

In this embodiment, the modeling portion 110 includes the supporting platform 111 and the modeling sink 112. The powder supplying portion 120 includes a powder supplying sink 121 and a powder supplying platform 122. The powder supplying sink 121 is filled with the powder forming material 120a and disposed beside the modeling sink 112. The powder supplying platform 122 is disposed in the powder supplying sink 121 and moves up or down along a second axial direction (Z-axis direction). In addition, the first axial direction is perpendicular to the second axial direction. The powder supplying platform 122 pushes the powder forming material 120a upward out of an opening of the powder supplying sink 121 to supply the powder forming material 120a to be spread above the modeling sink 112.

In this embodiment, the powder spreading mechanism 130 is disposed above the base 10 and configured to move back and forth along the first axial direction (X-axis) on a printing reference surface $P_L$. More specifically, the powder spreading mechanism 130 is disposed beside the opening of the powder supplying sink 121 and passes above the supporting platform 111 along the second direction (a positive X direction) toward the second side of the modeling portion 110, so as to transfer the powder forming material 120a above the supporting platform 111. Then, the powder spreading mechanism 130 moves back to the first side of the modeling portion 110 along the first direction (a negative X direction). In other words, after completing powder spreading, the powder spreading mechanism 130 may pass above the modeling portion 110 and then pass above the powder supplying portion 120 to return to a preparation position. The powder spreading mechanism 130 includes a powder spreading roller 131. Through rolling of the powder spreading roller 131, the powder forming material 120a on the powder supplying portion 120 is transferred in motion onto the supporting platform 111.

In this embodiment, the three-dimensional printing apparatus 100 further includes a transportation mechanism 170, a belt conveyor 171 and a movement rail 180. The movement rail 180 is disposed in pair on the base 10, and the movement rail 180 extends along the first axial direction (X direction). The powder spreading mechanism 130 is connected with the belt conveyor 171. The transportation mechanism 170 is coupled to the controller 150 and the powder spreading mechanism 130, and drives the powder spreading mechanism 130 to move in the first axial direction (X direction) under the control of the controller 150. Specifically, the transportation mechanism 170 may drive the belt conveyor 171 to rotate in a clockwise direction or a counter-clockwise direction, such that the belt conveyor 171 drives the powder spreading mechanism 130 to move back and forth on the movement rail 180.

In addition, the printing mechanism 140 is disposed above the base 10 and configured to move back and forth on the printing reference surface PL along the first axial direction (X-axis). The printing mechanism 140 may include at least one printing head. The printing head may coat the glue material 140a to the powder forming material 120a on the supporting platform 111. In this embodiment, the three-dimensional printing apparatus 100 further includes a transportation mechanism 160 and a belt conveyor 161. The printing mechanism 140 is connected with the belt conveyor 161. The transportation mechanism 160 is coupled to the controller 150, and is coupled to the printing mechanism 140 through the belt conveyor 161. The transportation mechanism 160 drives the printing mechanism 140 to move in the first axial direction (X-axis direction) under the control of the controller 150. Specifically, the transportation mechanism 160 may drive the belt conveyor 161 to rotate in the clockwise direction or the counter-clockwise direction, such that the belt conveyor 161 drives the printing mechanism 140 to move back and forth on the movement rail 180.

The controller 150 may control the powder spreading mechanism 130 and the printing mechanism 140 to move in the X direction parallel to the printing reference surface PL based on the three-dimensional printing model information. The powder spreading roller 131 is configured to roll forward in the positive X direction, so as to transfer the powder forming material 120a of the powder supplying portion 120 onto the modeling portion 110, and returns to the preparation position along the negative X direction to perform the next powder spreading operation. The printing mechanism 140 is configured to coat the glue material 140a layer-by-layer on the supporting platform 111 based on the three-dimensional model information, so as to adhere layer-by-layer the powder forming material 120a on the supporting platform 111 to form the modeling powder layers. The modeling powder layers are stacked with respect to each other to form the three-dimensional object.

In this embodiment, the three-dimensional printing apparatus 100 further includes a maintenance mechanism 210. The maintenance mechanism 210 is disposed at a side of the modeling portion 110 to prevent the printing mechanism 140 from contacting the powder forming material 120a while the powder spreading mechanism 130 spreads the powder forming material 120a. While the powder spreading mechanism 130 spreads the powder forming material 120a above the supporting platform 111, the printing mechanism 140 stays above the maintenance mechanism 210. In addition, the maintenance mechanism 210 may clean the printing head of the printing mechanism 140, so as to prevent the printing head from being clogged due to the residual glue material 140a or the powder forming material 120a in the air attached to the printing head.

It should be noted that, since the powder spreading mechanism 130 and the printing mechanism 140 are respectively driven by the different transportation mechanism 160 and transportation mechanism 170 to move on the printing reference surface PL, the controller 150 is able to independently control the timing and directions that the powder spreading mechanism 130 and the printing mechanism 140 move. In this way, the controller 150 may separately control the powder spreading mechanism 130 and the printing mechanism 140 to move in the fast mode and the normal mode based on different controlling processes.

More specifically, a difference between the fast mode and the normal mode is that the printing direction of the printing mechanism 140 differs. While operating in the fast mode, the printing mechanism 140 may start moving toward the negative X direction and coat the glue material on the supporting platform 111 at the same time while the powder spreading mechanism 130 returns to the preparation position. In addition, while operating in the normal mode, in order to make the powder spreading direction and the printing direction consistent, the printing mechanism 140 needs to move from a side of the modeling portion 110 to an interface between the modeling sink 112 and the powder supplying sink 121 along the negative X direction, and then move from the interface between the modeling sink 112 and the powder supplying sink 121 along the positive X direction and coat the glue material 140a on the supporting platform 111.

Accordingly, in the fast mode, the printing mechanism 140 does not needs to wait until the powder spreading mechanism 130 returns to the preparation position to start operating, but the supporting platform 111 and the powder supplying platform 122 may start moving up and down at the same time while the printing mechanism 140 returns to the maintenance mechanism 210. Thus, while the three-dimensional printing apparatus 100 operates in the fast mode, a three-dimensional efficiency may be improved. In addition, in the normal mode, since the printing direction of the printing mechanism 140 is the same as the powder spreading direction of the powder spreading mechanism 130, the powder spreading mechanism 130 may spread the powder forming material 120a on the glue material coated on the supporting platform 111 in advance, so as to prevent cracking or fragmentation of the modeling powder layer due to inconsistent degrees of dryness. Therefore, while the three-dimensional printing apparatus 100 operates in the normal mode, a three-dimensional printing quality may be improved.

Figure 4A:
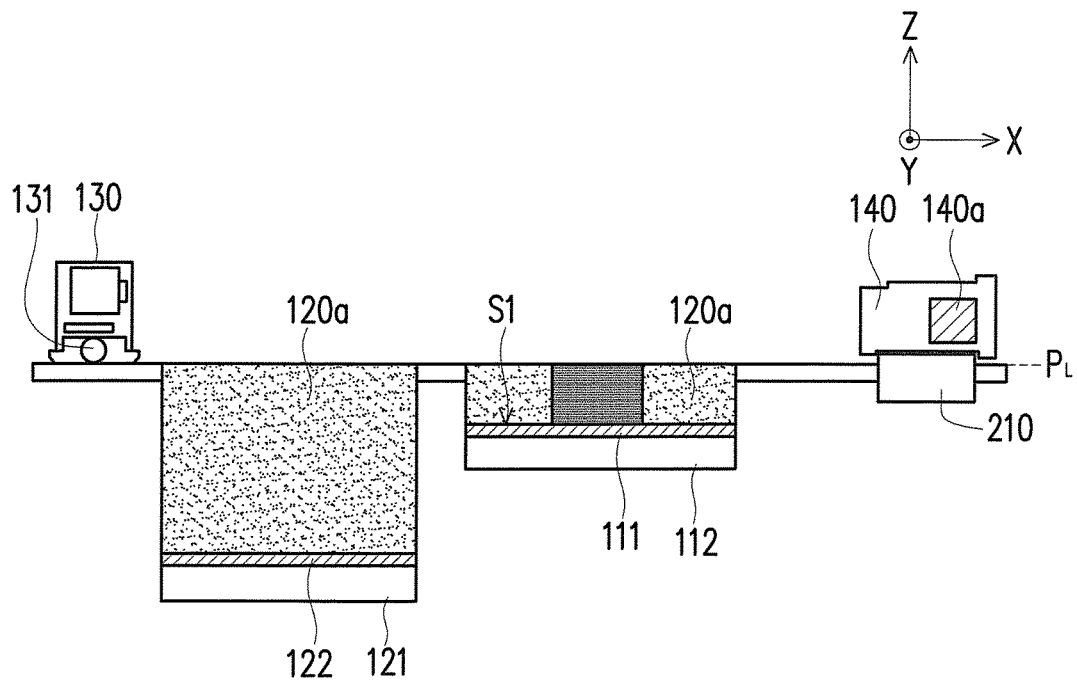
FIGS. 4A to 4F are schematic views illustrating an operation of a three-dimensional printing apparatus according to an embodiment of the disclosure in a fast mode.

In the following, operations of the powder spreading mechanism 130 and the printing mechanism 140 in different modes are described. FIGS. 4A to 4F are schematic views illustrating an operation of a three-dimensional printing apparatus according to an embodiment of the disclosure in a fast mode. FIGS. 4A to 4F illustrate a formation process of the modeling powder layer while the three-dimensional printing apparatus operates in the fast mode. Referring to FIG. 4A, while the three-dimensional printing apparatus 100 is in a default state and does not start to print yet, the powder spreading mechanism 130 and the printing mechanism 140 are respectively located at their preparation positions. In this embodiment, the powder spreading mechanism 130 and the printing mechanism 140 are respectively located at opposite sides of the powder supplying sink 121 and the modeling sink 112. In this example, a three-dimensional object 40 formed by stacking the modeling powder layers is already formed on the supporting platform 111.

Figure 4B:
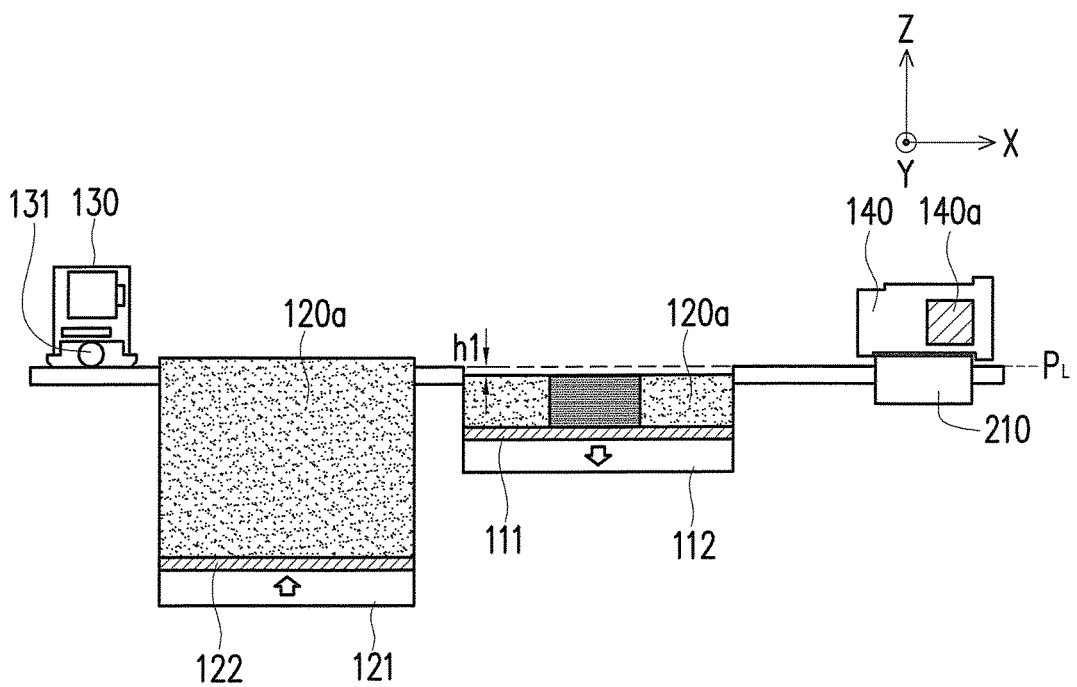

Then, referring to FIG. 4B, the powder supplying platform 122 moves up toward the printing reference surface $P_L$, and the supporting platform 111 moves down a predetermined height h1. Thus, the powder forming material 120a in the powder supplying sink 121 is moved up by the powder supplying platform 122 and spilled from the opening of the powder supplying sink 121, and an amount of the powder forming material 120a spilled from the powder supplying sink 121 is sufficient to fill a gap created as the supporting platform 111 moves down. The supporting platform 111 moves down in a direction away from the printing reference surface $P_L$, thus forming a gap between an upper surface of the powder forming material 120a in the modeling sink 120a and the printing reference surface $P_L$. It should be noted that the predetermined height h1 is a thickness of the modeling powder layer.

Figure 4C:
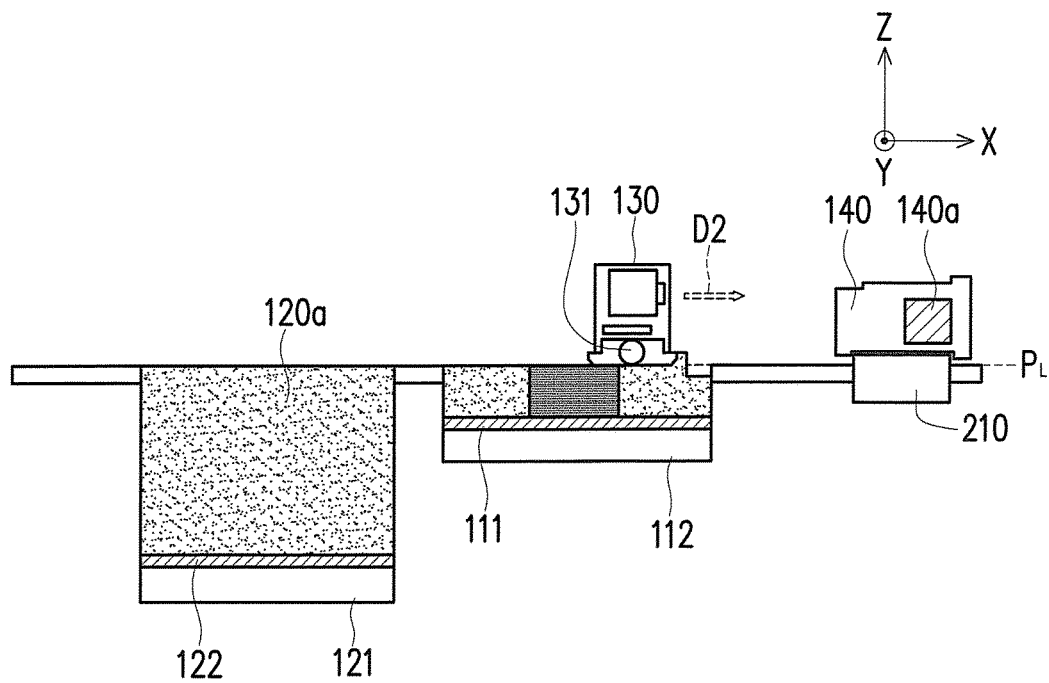

Then, referring to FIG. 4C, the powder spreading mechanism 130 moves from the first side of the powder supplying sink 121 along the second direction D2, such that the powder supplying mechanism 130 passes above the powder supplying sink 111 and then passes above the modeling sink 112, so as to spread the powder spreading material 120a above the supporting platform 111. Specifically, the powder spreading roller 131 may push the powder forming material 120a spilled from the powder supplying sink 121 above the modeling sink 112, so as to fill the gap below the printing reference surface PL in the modeling sink 120a with the powder forming material 120a again. Through processes shown in FIGS. 4A to 4C, the powder spreading mechanism 130 completes powder spreading along the powder spreading direction.

Figure 4D:
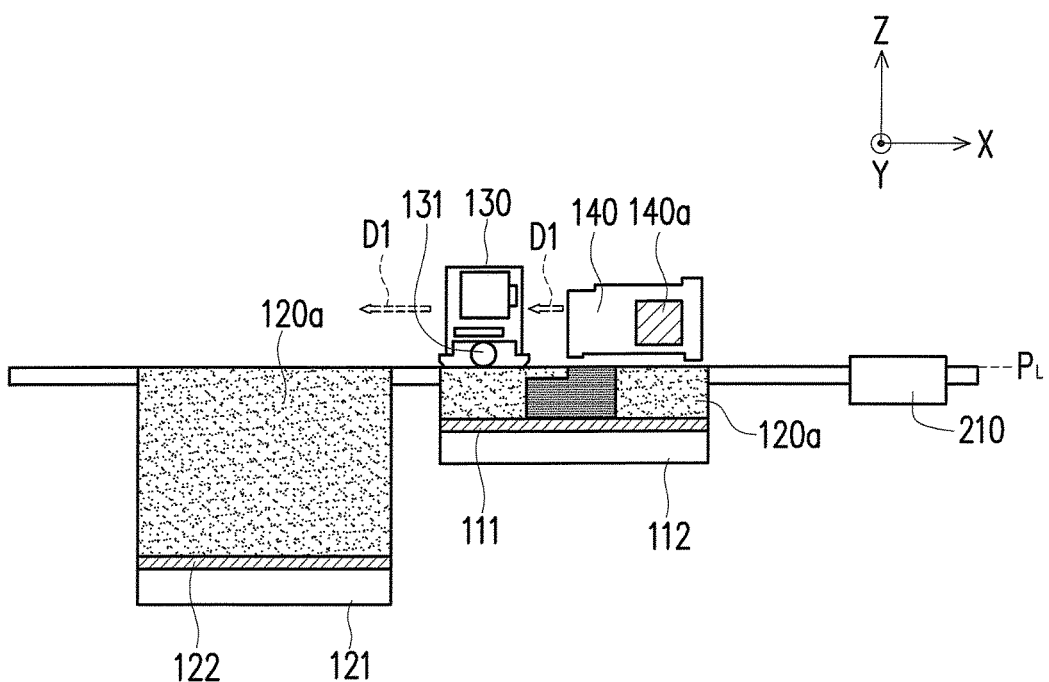

Referring to FIG. 4D, after the powder spreading mechanism 130 completes powder spreading along the powder spreading direction, the powder spreading mechanism 130 moves from the second side of the modeling sink 112 to the first side of the modeling sink 112 along the first direction D1. In the meantime, the printing mechanism 140 also moves along the first direction D1 and ejects the glue material 140a along the first direction D1, so as to adhere the powder forming material 120a in the modeling sink 112 and form a new modeling powder layer. In other words, even if the powder spreading mechanism 130 is still above the modeling sink 112, the printing mechanism 140 may still start printing, so as to shorten an idling time of the printing mechanism 140 and increase the printing speed.

Figure 4E:
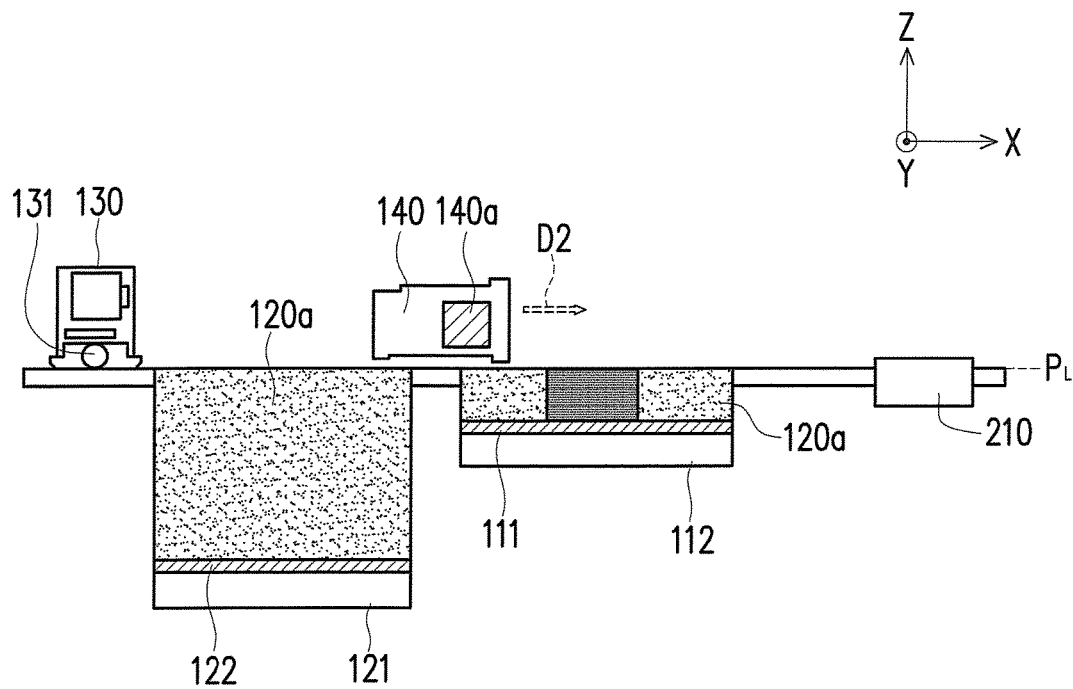
Figure 4F:
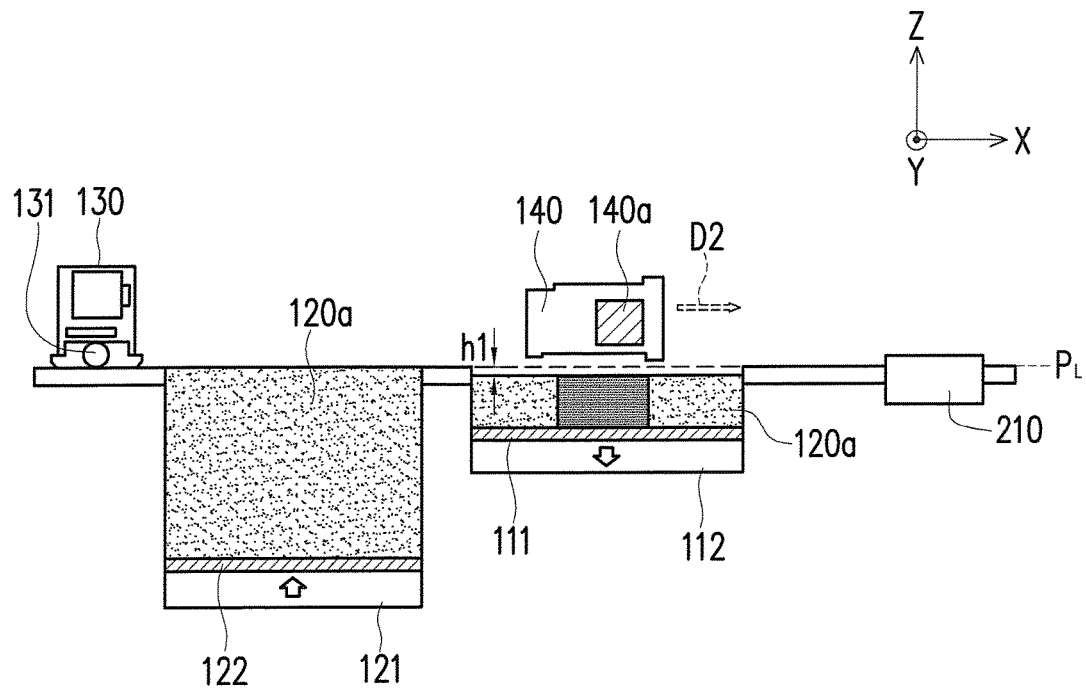

Referring to FIG. 4E, after the printing mechanism 140 moves from the second side of the printing sink 112 to a position between the powder supplying sink 121 and the modeling sink 112, the new modeling powder layer is formed on the supporting platform 112, and the powder spreading mechanism 130 also returns to the initial preparation position for another powder spreading process. After printing along the first direction D1, the printing mechanism 140 returns to the preparation position from the interface between powder supplying sink 121 and the modeling sink 112 along the second direction D2. Referring to FIG. 4, in this embodiment, while the printing mechanism 140 moves away from the powder supplying sink 121, the powder supplying platform 122 may simultaneously start moving toward the printing reference surface $P_L$, and the supporting platform 111 may start moving away from the printing reference surface PL. Accordingly, the powder spreading mechanism 130 may start powder spreading while movements of the powder supplying platform 122 and the supporting platform 111 completes.

Figure 5A:
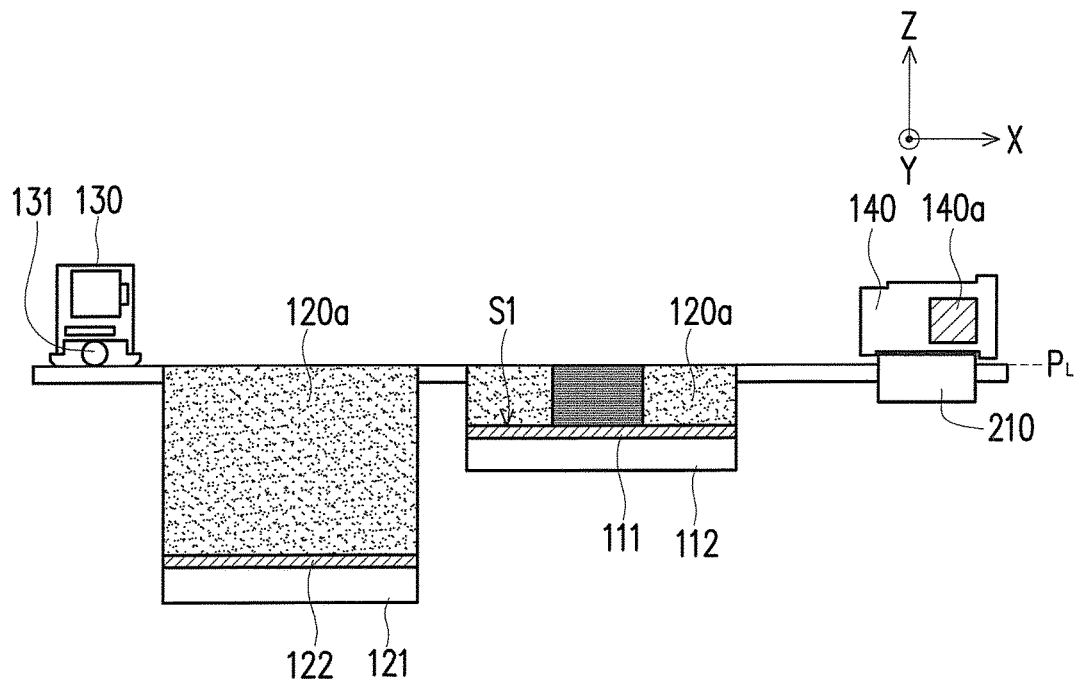
FIGS. 5A to 5F are schematic views illustrating an operation of a three-dimensional printing apparatus according to an embodiment of the disclosure in a normal mode.
Figure 5B:
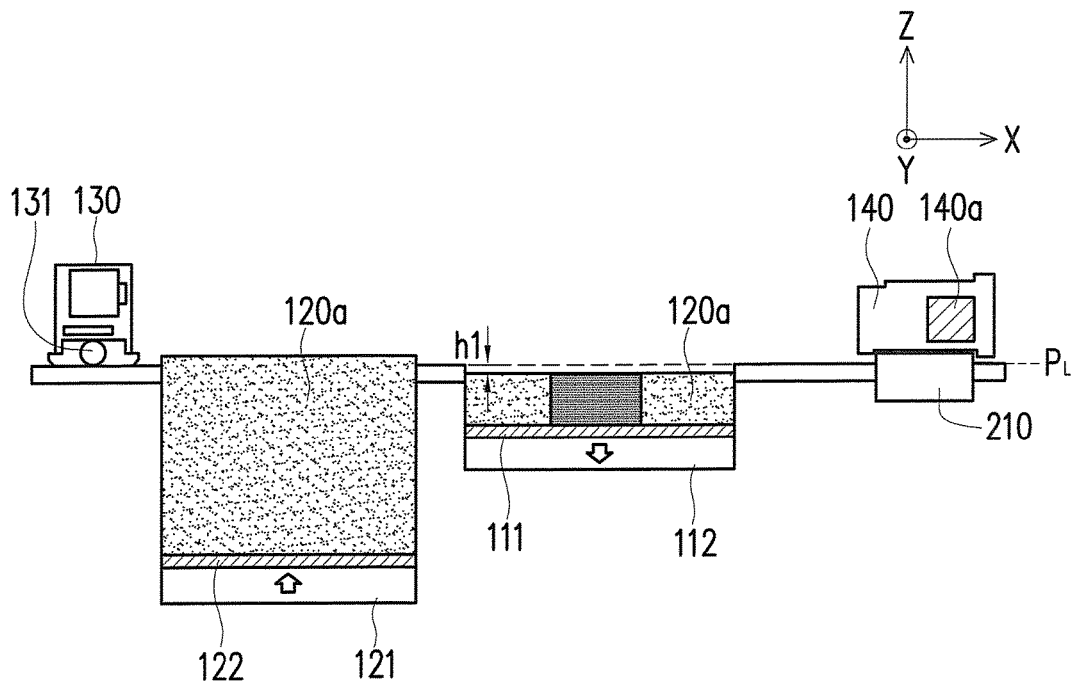
Figure 5C:
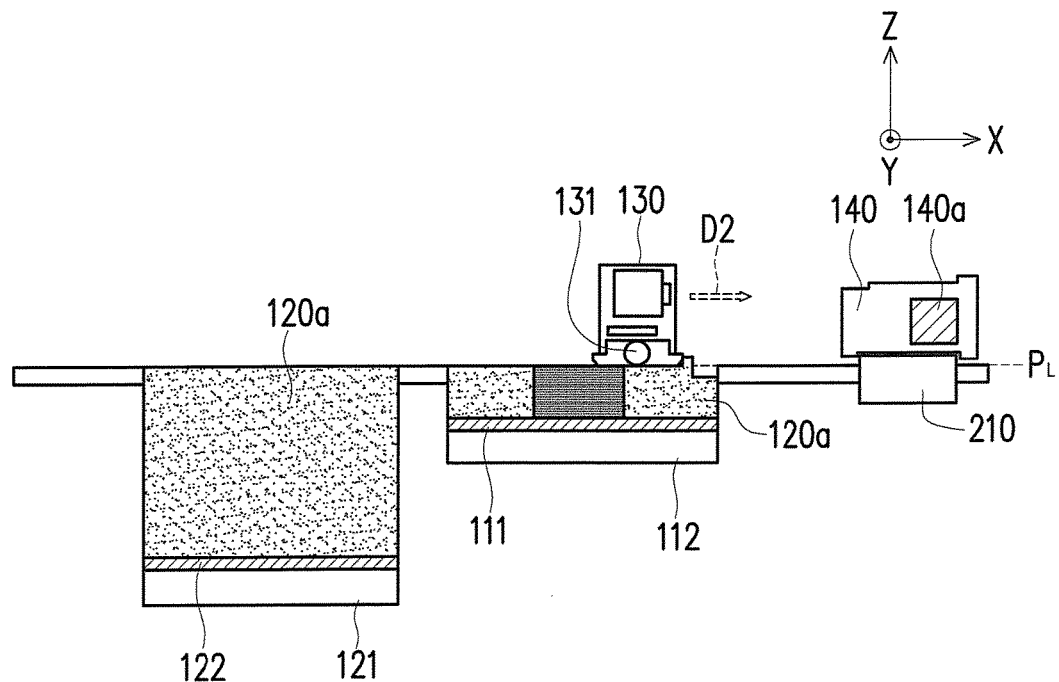

FIGS. 5A to 5F are schematic views illustrating an operation of a three-dimensional printing apparatus according to an embodiment of the disclosure in a normal mode. FIGS. 5A to 5F illustrate a formation process of the modeling powder layer while the three-dimensional printing apparatus operates in the normal mode. It should be noted that processes of the powder spreading mechanism 130 shown in FIGS. 5A to 5C are similar to processes shown in FIGS. 4A to 4C. Thus, details in this respect will not be repeated in the following. In brief, after the processes in FIGS. 5A to 5C, the powder spreading mechanism 130 completes powder spreading along the second direction D2, and is located between the modeling sink 12 and the printing mechanism 140.

Figure 5D:
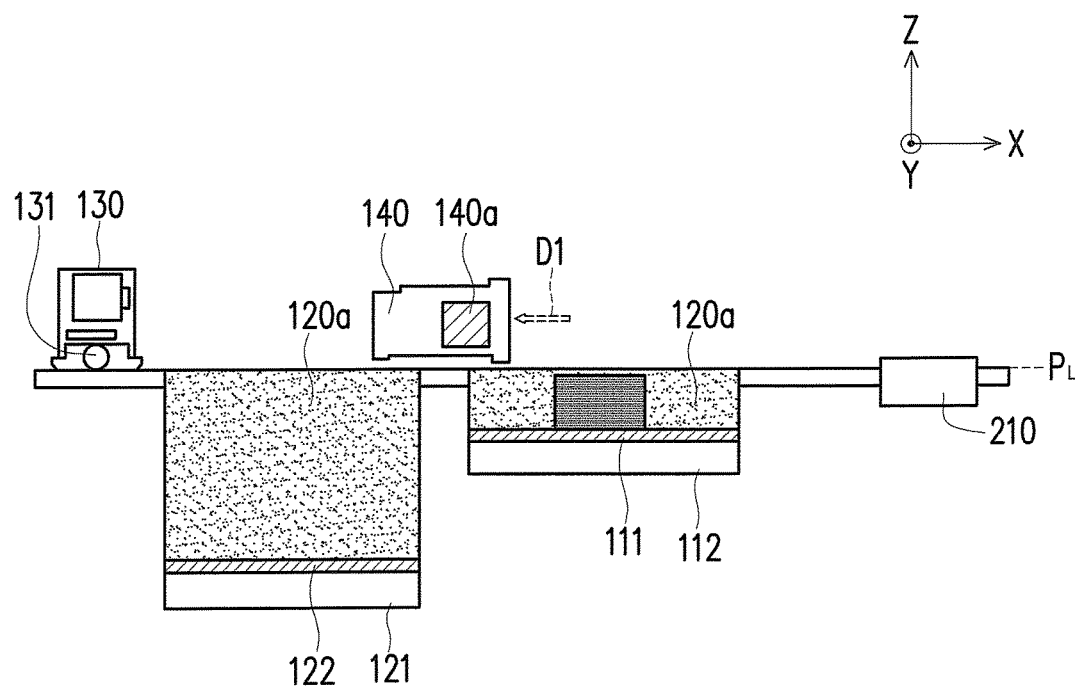
Figure 5E:
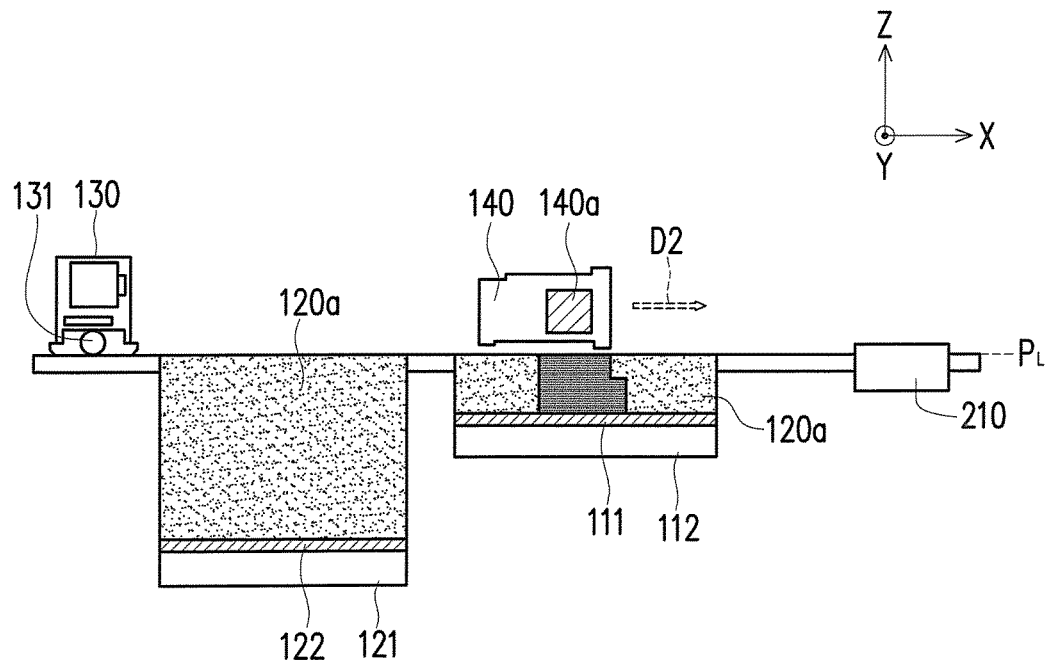
Figure 5F:
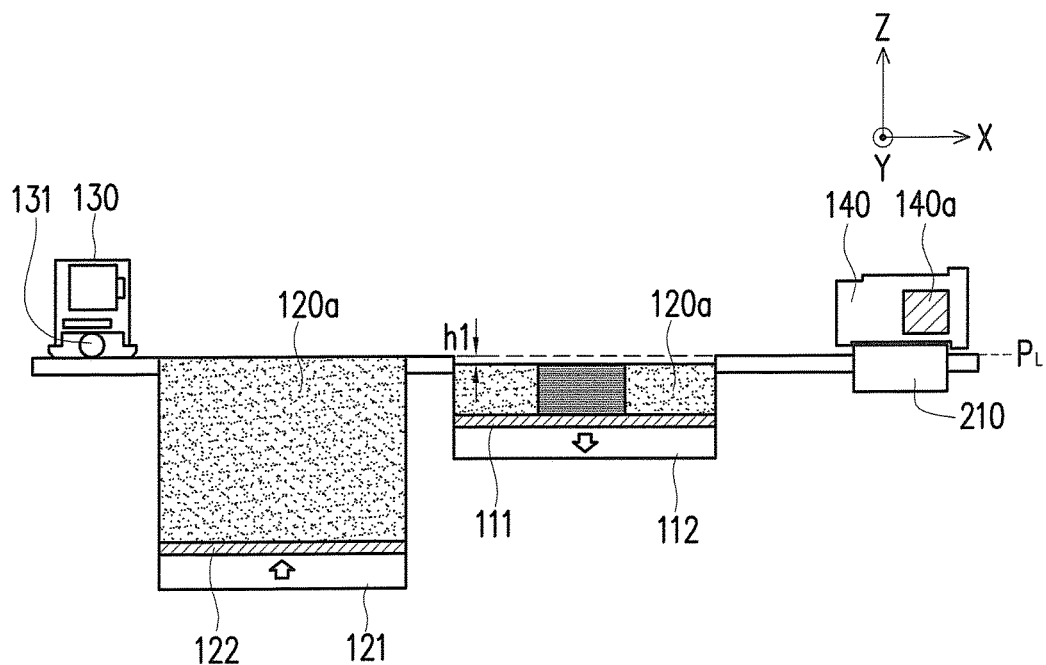

Then, referring to FIG. 5D, after completing powder spreading along the powder spreading direction, the powder spreading mechanism 130 passes above the modeling sink 112 and then passes above the powder supplying sink 121 and returns to the preparation position along the first direction D1. In the meantime, the printing mechanism 140 also moves to the interface between the powder supplying sink 121 and the modeling sink 112 along the first direction D1. It should be noted that, while moving along the first direction D1, the printing mechanism 140 does not start to eject the glue material 140a yet. Then, referring to FIG. 5E, while the printing mechanism 140 moves along the second direction D2 and passes above the modeling sink 112, the printing mechanism 140 also ejects the glue material 140a to the powder forming material 120a above the supporting platform 111, so as to adhere the powder forming material 120a in the modeling sink 112 and form a new modeling powder layer. Namely, in the normal mode, the powder spreading direction of the powder spreading mechanism 130 and the printing direction of the printing mechanism 140 are the second direction D2. Thus, the printing quality is not affected by different degrees of dryness of the glue material 140a. Referring to FIG. 5F again, in the normal mode, the powder supplying platform 122 and the modeling platform 111 need to wait until the printing mechanism 140 completes printing to respectively move up and down.

In view of the foregoing, by using the independent transportation mechanisms to respectively control the powder spreading mechanism and the printing mechanism to move in the same axial direction, the three-dimensional printing apparatus according to the embodiments of the disclosure is capable of independently controlling the timing and paths that the powder spreading mechanism and the printing apparatus move. Accordingly, the three-dimensional printing apparatus may operate in different modes based on the command, and the printing mechanism may perform printing in respectively different printing directions in the fast mode and the normal mode. In this way, the three-dimensional printing apparatus may save waiting time in the powder spreading mechanism and the printing mechanism in the fast mode and increase the printing efficiency. Alternatively, the three-dimensional printing apparatus may also make the printing direction and the powder spreading direction in the normal mode consistent to ensure the printing quality. Accordingly, the embodiments of the disclosure make the three-dimensional printing apparatus more flexible and convenient to use, and improve the three-dimensional printing efficiency.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A three-dimensional printing apparatus, adapted to print a three-dimensional object, the apparatus comprising:
    a modeling portion, comprising a supporting platform;
    a powder supplying portion, filled with a powder forming material;
    a powder spreading mechanism, disposed at a first side of the modeling portion, moving along a first axial direction parallel to a supporting surface of the supporting platform, and transferring the powder forming material from the powder supplying portion so as to spread the powder forming material above the supporting platform;
    a printing mechanism, disposed at a second side of the modeling portion opposite to the powder spreading mechanism, moving along the first axial direction, and adapted to eject a glue material toward the powder forming material on the supporting platform, such that a three-dimensional object is formed layer-by-layer on the supporting platform; and
    a controller, coupled to the powder spreading mechanism and the printing mechanism and is programmed to operate in a fast mode based on a fast mode command, wherein the controller is programmed to control the printing mechanism to eject the glue material onto the powder forming material while the printing mechanism and the powder spreading mechanism move along a first direction in the fast mode,
    wherein when the controller is programmed to operate in a normal mode based on a command, while the powder spreading mechanism is located above the modeling portion, moves along the second direction spreading the powder forming material and moves along the first direction back to the first side of the modeling portion in the normal mode, the controller is programmed to control the printing mechanism to move along the first direction from the second side of the modeling portion to the first side of the modeling portion, and then the controller is programmed to control the printing mechanism to move from the first side of the modeling portion along the second direction and simultaneously eject the glue material to the powder forming material above the modeling portion.

2. The three-dimensional printing apparatus as claimed in claim 1, wherein the powder spreading mechanism moves toward the second side of the modeling portion along a second direction to spread the powder forming material above the supporting platform, and then moves back to the first side of the modeling portion along the first direction.

3. The three-dimensional printing apparatus as claimed in claim 1, wherein in the fast mode, while the powder spreading mechanism is located above the modeling portion and moves along the first direction back to the first side of the modeling portion, the printing mechanism moves along the first direction and simultaneously ejects the glue material onto the powder forming material above the modeling portion.

4. The three-dimensional printing apparatus as claimed in claim 1, wherein the modeling portion further comprises a modeling sink, and the supporting platform is disposed in the modeling sink and able to move up and down in the modeling sink.

5. The three-dimensional printing apparatus as claimed in claim 1, wherein the powder supplying portion further comprises a powder supplying sink and a powder supplying platform, the powder supplying sink is adapted to be filled with the powder forming material and disposed beside the modeling sink, the powder supplying platform is disposed in the powder supplying sink and moves up and down along a second axial direction, and the first axial direction is perpendicular to the second axial direction.

6. The three-dimensional printing apparatus as claimed in claim 5, wherein after the powder supplying platform moves up and the supporting platform moves down a predetermined height, the powder spreading mechanism starts moving from a side of the powder supplying sink along the first direction, such that the powder spreading mechanism passes above the powder supplying sink and then passes above the modeling sink to spread the powder forming material above the supporting platform.

7. The three-dimensional printing apparatus as claimed in claim 5, wherein in an operation of the fast mode, while the printing mechanism moves along the first direction, the powder supplying platform moves up and the supporting platform moves down a predetermined height.

8. The three-dimensional printing apparatus as claimed in claim 1, further comprising:
   a first transportation mechanism, coupled to the controller and the powder spreading mechanism, and driving the powder spreading mechanism to move along the first axial direction under control of the controller; and
   a second transportation mechanism, coupled to the controller and the printing mechanism, and driving the printing mechanism to move along the first axial direction under the control of the controller.

9. The three-dimensional printing apparatus as claimed in claim 1, further comprising a maintenance mechanism, disposed at the second side of the modeling portion and adapted to prevent the printing mechanism from contacting the powder forming material while the powder spreading mechanism spreads the powder forming material, wherein while the powder spreading mechanism spreads the powder forming material on the supporting platform, the printing mechanism stays above the maintenance mechanism.

* * * * *